United States Patent
Xu et al.

(10) Patent No.: US 11,110,637 B2
(45) Date of Patent: Sep. 7, 2021

(54) CO-ROTATING SELF-CLEANING MULTI-SCREW EXTRUDER WITH SPEED RATIO OF 2.5 AND EXTRUDING METHOD THEREFOR

(71) Applicant: Guangdong Industry Polytechnic, Guangzhou (CN)

(72) Inventors: Baiping Xu, Guangzhou (CN); Huiwen Yu, Guangzhou (CN); Liang He, Guangzhou (CN); Jinwei Chen, Guangzhou (CN); Wenliu Zhuang, Guangzhou (CN); Mei Li, Guangzhou (CN)

(73) Assignee: Guangdong Industry Polytechnic

( * ) Notice: Subject to any disclaimer, the term of this patent is extended or adjusted under 35 U.S.C. 154(b) by 179 days.

(21) Appl. No.: 16/609,059

(22) PCT Filed: Sep. 25, 2017

(86) PCT No.: PCT/CN2017/103121
§ 371 (c)(1),
(2) Date: Oct. 28, 2019

(87) PCT Pub. No.: WO2018/196274
PCT Pub. Date: Jan. 11, 2018

(65) Prior Publication Data
US 2020/0055012 A1    Feb. 20, 2020

(30) Foreign Application Priority Data

Apr. 28, 2017    (CN) .......................... 201710291690.4

(51) Int. Cl.
*B29C 48/405*    (2019.01)
*B01F 7/00*    (2006.01)
(Continued)

(52) U.S. Cl.
CPC ........ *B29C 48/405* (2019.02); *B01F 7/00416* (2013.01); *B01F 7/00633* (2013.01);
(Continued)

(58) Field of Classification Search
CPC ..... B29C 48/405; B29C 48/655; B29C 48/63; B29C 48/44; B29C 48/425; B29C 48/402;
(Continued)

(56) References Cited

U.S. PATENT DOCUMENTS 2,802,238 A * 8/1957 Colombo .............. B29C 48/435
366/85
2,814,472 A * 11/1957 Erdmenger ............. B01F 7/105
366/97

(Continued)

FOREIGN PATENT DOCUMENTS

| CN | 101823327 A | 9/2010 |
| CN | 101837633 A | 9/2010 |
| CN | 106926430 A | 7/2017 |

*Primary Examiner* — Tony G Soohoo
(74) *Attorney, Agent, or Firm* — The Webb Law Firm

(57) ABSTRACT

A co-rotating self-cleaning multi-screw extruder with a speed ratio of 2.5 and an extruding method therefor are disclosed. The screw mechanism includes a center screw and peripheral screws which rotate in the same direction. The peripheral screws are each of a double threaded structure, and the center screw is of a quintuple threaded structure. The rotation speed of the peripheral screws is 2.5 times that of the center screw, and the peripheral screws are always meshed with the center screw, whereas the adjacent peripheral screws are intermittently meshed with each other. The extruding method therefor is as follows: there is a periodically open space between adjacent peripheral screws, providing the periodical and intermittent mixing action, so that material from different thread grooves is mixed with each other. Meanwhile, the topological chaos action, by which the material is cut into two portions, is formed between the (Continued)

center screw and the peripheral screws, and the chaos mixing is caused by the random motion which is generated from the periodical changes of the channel, so that a periodical action of "compression-expansion" is achieved. Furthermore, due to the tensile force field action caused by the differences in rotation speed between the center screw and the peripheral screws, the compression preheating and dispersion mixing of the material are achieved. The co-rotating self-cleaning multi-screw extruder effectively improves the efficiency of conveying and mixing of materials.

10 Claims, 5 Drawing Sheets

(51) Int. Cl.
*B29C 48/44* (2019.01)
*B29C 48/655* (2019.01)
*B29C 48/40* (2019.01)
*B29C 48/415* (2019.01)

(52) U.S. Cl.
CPC ...... *B01F 7/00808* (2013.01); *B01F 7/00816* (2013.01); *B29C 48/40* (2019.02); *B29C 48/44* (2019.02); *B29C 48/655* (2019.02); *B01F 2215/0049* (2013.01); *B29C 48/415* (2019.02)

(58) Field of Classification Search
CPC ..... B29C 48/505; B29C 48/40; B29C 48/415; B01F 7/00416; B01F 7/00633; B01F 7/00808; B01F 7/00816; B01F 2215/0049
See application file for complete search history.

(56) References Cited

U.S. PATENT DOCUMENTS

| | | | | |
|---|---|---|---|---|
| 3,825,236 | A * | 7/1974 | Hussmann | B29C 48/435 366/76.1 |
| 4,131,371 | A * | 12/1978 | Tynan | B29B 7/489 366/301 |
| 4,289,409 | A * | 9/1981 | Brand | B29B 7/485 366/83 |
| 5,510,073 | A * | 4/1996 | Kaegi | B29C 48/252 264/211.23 |
| 6,074,084 | A * | 6/2000 | Kolossow | B29B 7/487 366/84 |
| 9,038,811 | B2 * | 5/2015 | Nilsson | B01F 7/082 198/562 |
| 9,174,380 | B2 * | 11/2015 | Xu | B29B 7/489 |
| 10,112,320 | B2 * | 10/2018 | Rust | B29B 7/485 |
| 10,112,336 | B2 * | 10/2018 | Rust | B29B 7/826 |
| 10,414,081 | B2 * | 9/2019 | Blach | B29C 48/402 |
| 2010/0151028 | A1 * | 6/2010 | Ashworth | A61K 31/135 424/485 |
| 2015/0118352 | A1 * | 4/2015 | Visscher | B29B 7/485 426/3 |
| 2020/0055012 | A1 * | 2/2020 | Xu | B01F 7/00633 |
| 2020/0282369 | A1 * | 9/2020 | Gneuss | B01F 7/14 |
| 2020/0368940 | A1 * | 11/2020 | Clark | C08J 11/06 |
| 2020/0399786 | A1 * | 12/2020 | Williams | C08J 11/16 |

* cited by examiner

CO-ROTATING SELF-CLEANING MULTI-SCREW EXTRUDER WITH SPEED RATIO OF 2.5 AND EXTRUDING METHOD THEREFOR

CROSS-REFERENCE TO RELATED APPLICATIONS

This application is the United States national phase of International Application No. PCT/CN2017/103121 filed Sep. 25, 2017, and claims priority to Chinese Patent Application No. 201710291690.4 filed Apr. 28, 2017, the disclosures of each of which are hereby incorporated by reference in their entireties.

TECHNICAL FIELD

The present invention relates to the technique field of screw extrusion processing, in particular to a co-rotating self-cleaning multi-screw extruder with a speed ratio of 2.5 and an extruding method therefor.

BACKGROUND ART

Provided with a self-cleaning function, co-rotating double threaded extruders are popular apparatuses for mixing and processing. This type of apparatus usually comprises a barrel and two identical screws, and the axes of the screws are arranged in parallel with the axis of the barrel. In order to improve the mixing effect, multi threaded structures are frequently used to realize different flow topology paths. For example, conventional co-rotating twin-screw extruders are often provided with double threaded screws. From the view of the topology paths, three separate and independent channels will be generated from this kind of structure, and the materials in the different channels cannot be mixed with each other. As a result, when there is a fluctuation in constituents of processed material at a feed port, there will be instability of product quality at a discharge port. The mixing of the materials from the different channels can be realized only in kneading block sections. However, the kneading block sections will lead to super high shear rates, existence of dead sections, abrupt increases in energy consumption, degraded self-cleaning function and degradation of the materials and so on. If open spaces are provided between the screws, the fluctuation in constituents of the feeding material can be reduced significantly and the mixing between the different screws can be enhanced, which compromises the self-cleaning function of screws.

On the other hand, in order to ensure the meshing movement between the screws, multi-threaded screws will result in a decrease of the screw channel depth, which lead to the decrease of the output. The two screws in conventional co-rotating twin-screws have the same geometric shape and the volume of channels is same, which result in the lack of symmetry breaking effect. It is commonly accepted that the meshing section plays a significant role in mixing enhancement. However, there are no elongation effects owing to constant channel volume, while the elongation effects are more efficient to achieve high-level melting and dispersive mixing. In addition, the screw channels are always partially filled during the process, and the cross sections of the screw grooves in a conventional twin-screw are constant, which results in a reduction in the efficiency of melting and mixing. Therefore, high rotation speed is often applied to achieve a high shear rate, at the same time the larger length-to-diameter ratio has to be adopted to extend the residence time. With the increasing demand for high output and efficient mixing in the actual project, the above measures will lead to many problems, such as huge energy consumption, low efficiency, degradation of materials, and so on.

In order to introduce the elongation action, it is necessary to adopt different shapes of screws and provide speed difference between screws. Recent studies have revealed that periodic and intermittent actions can greatly improve the effect of mixing. If a pair of screws remain in contact with each other for some time during one rotation cycle, and do not remain in contact with each other for the rest of the cycle, periodic and intermittent effects can be introduced. The development of such novel screws will open up a new way to enhance mixing. Moreover, in the premise of keeping the self-cleaning function, constructing open spaces between co-rotating screws with different speed ratios is a key to advancing current mixing and melting effects in polymer processing.

SUMMARY OF THE INVENTION

In order to overcome deficiencies in the prior art, the present invention provides a co-rotating self-cleaning multi-screw extruder with a speed ratio of 2.5, which takes full advantages of mutual mixing between screws, the action of the elongational force field, and periodic and intermittent action to improve the processing and mixing efficiency of materials.

Another purpose of the present invention is to provide an extruding method for the above co-rotating self-cleaning multi-screw extruder with a speed ratio of 2.5.

The technical solution of the present invention is: a co-rotating self-cleaning multi-screw extruder with a speed ratio of 2.5, comprising a barrel and a screw mechanism installed in an inner cavity of the barrel, wherein the screw mechanism comprises a center screw and at least two peripheral screws; the peripheral screws are each of a double threaded structure, and the center screw is of a quintuple threaded structure; the peripheral screws rotate in the same direction as the center screw, the rotation speed of each peripheral screw is 2.5 times that of the center screw; and the peripheral screws are always meshed with the center screw during the rotation of the screw mechanism, whereas the adjacent peripheral screws are intermittently meshed with each other. The surface of the center screw and the surfaces of peripheral screws are always in contact in the extruder of this structure during the rotation process of the screw mechanism, which can achieve the self-cleaning function, while the surfaces of adjacent two peripheral screws remain in contact for some time during the rotation, and there is clearance in the remaining time. Such a structure can allow the mixing of materials from different screw grooves, and also takes advantage of the periodic and intermittent actions to improve melting and mixing effects. The speed ratio of the peripheral screws and the center screw is 2.5, which is the only choice in the case of the different rotating speeds of the screw mechanism. Only when the speed ratio is 2.5, can the center distances between the peripheral screws and the center screw be ensured consistent and an angle formed by the long axis of the cross section of any two adjacent peripheral screws be kept at 90 degrees angle, so as to avoid interference phenomenon when they mesh with each other.

As a preferred embodiment, the screw mechanism comprises a center screw and six peripheral screws, and the six peripheral screws are evenly distributed along the outer circumferential direction of the center screw; outer contour lines of the six peripheral screws are tangent to an inner wall of the barrel, and a material conveying channel is formed between the screw mechanism and the inner cavity of the barrel.

Cross section contours of the center screw and the peripheral screws are respectively formed of multiple connected sections of curved arcs, there are 20 sections of curved arcs that form the cross section contour of the center screw, and there are 8 sections of curved arcs that form the cross section contour of the peripheral screw.

The maximum outer diameter of the center screw and each peripheral screw is D, the minimum inner diameter thereof is d, D/d=1.1-1.5, and the screw lead is 0.01D-100000D.

A cross section contour of the central screw is pentagonal overall, all the peripheral screws have the same structure, and the cross section contour of the peripheral screw is ellipse overall.

The curved arcs successively connected to form the cross section contour of the center screw are N1N2, N2N3, N3N4, N4N5, N5N6, N6N7, N7N8, N8N9, N9N10, N10N11, N11N12, N12N13, N13N14, N14N15, N15N16, N16N17, N17N18, N18N19, N19N20 and N20N1, of which N2N3, N6N7, N10N11, N14N15, N18N19, N4N5, N8N9, N12N13, N16N17 and N20N1 are all circular curves, and the rest are all non-circular curves.

The curved arcs successively connected to form the cross section contour of the peripheral screw are M1M2, M2M3, M3M4, M4M5, M5M6, M6M7, M7M8 and M8M1, of which M2M3, M6M7, M4M5 and M8M1 are all circular curves, and the rest are all non-circular curves.

As another preferred embodiment, the screw mechanism comprises a center screw and two peripheral screws, the two peripheral screws are distributed on the same outer side of the center screw, and connecting lines between centers of the center screw and two peripheral screws form an equilateral triangle in the cross-sectional profile of the screw mechanism.

The barrel is provided with a conveying section, a melting section, an exhaust section and a mixing and extruding section which are arranged in sequence along a material conveying direction; the conveying section is provided with a feed port in communication with the inner cavity of the barrel, the exhaust section is provided with an exhaust port in communication with the inner cavity of the barrel, and an end of the mixing and extruding section is provided with a discharge port.

The extruding method for the above-described co-rotating self-cleaning multi-screw extruder with a speed ratio of 2.5 is as follows: after the material enters the inner cavity of the barrel, the material is continuously conveyed forward under the driving action of the screw mechanism; during the conveying process, there is a periodically open space between every two adjacent peripheral screws, providing the periodical and intermittent mixing action in the screw mechanism, so that material from different thread grooves is mixed with each other; meanwhile, the topological chaos action, by which the material is cut into two portions, is formed between the center screw and the peripheral screws, and the chaos mixing is caused by the random motion which is generated from the periodical changes of the channel, so that a periodical action of "compression-expansion-recompression-reexpansion" is achieved in the entire material conveying channel formed between the screw mechanism and the inner cavity of barrel; furthermore, due to the tensile force field action caused by the differences in rotation speed between the center screw and the peripheral screws, the compression preheating and dispersion mixing of the material are achieved.

In the method described above, the specific process for conveying the material in the barrel is as follows:

(1) after the material enters a channel of the conveying section from the feed port, the center screw and the peripheral screws rotate in the same direction around respective axes; the material is conveyed to the melt section under the action of both an axial positive displacement conveying force and a frictional force between the center screw and the peripheral screws; at the same time, the mixing of material constituents from different thread grooves is achieved through a periodically open space between the adjacent peripheral screws;

(2) when the material moves to a channel in the melting section, the channel formed by meshing of the center screw and the peripheral screws are cut into two, and heat transfer is enhanced due to the resulted interface regeneration, while the material is compressed and squeezed due to the speed difference between the center screw and the peripheral screws and space compression, thereby achieving the pre-melting of the material, and the material is further melted due to combined action of friction heat generated by the high speed rotation of the center screw and the peripheral screws and external heating of the barrel, such that the material is turned into melt;

(3) after the melted material enters a channel of the exhaust section, the periodically open space is formed between thread grooves of adjacent peripheral screws, and the space is directly in communication with thread groove channels of the center screw, thus achieving the direct discharge of gases from the central screw, the channels of the screw mechanism are in communication with each other such that there are no independent and separate channels, and exhausting surface area of the material is increased, furthermore, the difference of rotation speeds and the variation of material ridges in different thread grooves between the center screw and the peripheral screws accelerate the discharge of gas from the exhaust port, meanwhile, the melted material is further moved in the direction of the mixing and extruding section due to the conveying action of the screw mechanism; and (4) when the melted material enters a channel of the mixing and extruding section, the melted material is subjected to the topological chaos action, by which same is cut into two portions, caused by the channel formed between the center screw and the peripheral screws, and to the intermittent action caused by the periodically open space between the adjacent peripheral screws, such that the chaos mixing caused by the random motion is achieved; furthermore, due to the periodic "compression-expansion" action generated in the channel formed by the adjacent peripheral screws, and the action of different rotation speeds of the center screw and the peripheral screws, the melted material is mixed and plasticized, thus the melted material is stably extruded from the discharge port; meanwhile, the peripheral screws and the center screw wipe each other so that the self-cleaning effect is achieved.

Compared with the prior art, the present invention has the following advantages and beneficial effects:

1. Within the present invention of a co-rotating self-cleaning multi-screw extruder with a speed ratio of 2.5, the center screw is surrounded by peripheral screws, and the rotation speed of peripheral screws is 2.5 times that of the center screw. There exists an periodically open space between each two adjacent double threaded screws, so that the materials from different screw grooves are mixed, which effectively solves the instability of product quality caused by the fluctuations of raw material composition.

2. The present invention of a co-rotating self-cleaning multi-screw extruder with a speed ratio of 2.5 uses three kinds of mixing enhancing mechanisms: (1) the periodic and intermittent actions are provided by the periodically open spaces between each two adjacent peripheral screws, achieving the mixing of forward conveyed material from the different screw channels; (2) the topological chaos action by which materials are cut into two portions is formed by the channels between the center screw and the peripheral screws, and the chaotic mixing is caused by the randomness introduced by the periodical changes of the conveying channels; (3) the periodic "compression-expansion-recompression-reexpansion" actions achieved by the conveying channels and the actions of different rotation speeds of the quintuple threaded screw and the double threaded screw bring the elongation force field mechanism, which achieve the compressed preheating and dispersive mixing effectively; as a result, the mixing and heat transferring process are significantly enhanced, the heating and mechanical processes of plasticization are greatly shorten, the effects of lowering energy consumption is significant in the present invention.

3. Within the present invention of a co-rotating self-cleaning multi-screw extruder with a speed ratio of 2.5, each peripheral screw meshes with the center screw and rotates in same direction at different rotation speeds with the center screw. Each two adjacent peripheral screws sometimes mesh and sometimes separate. The wiping effects between screws achieve the self-cleaning function during the processing.

4. The co-rotating self-cleaning multi-screw extruder with a speed ratio of 2.5 in the present invention takes full advantages of the powerful conveying ability of multi-screws, increases the conveying efficiency of solid conveying, and meets the requirements of large output; there exist the periodically intermittent actions and elongation force fields, which fully increase intensity and effects of mixing, have significantly outstanding effects of the distributive and dispersive mixing, greatly improve the self-cleaning functions during the processing without using the kneading block, achieve much narrower residence time distributions during processing, improve the efficiency and effects of processing, and are especially suitable for the processing of high output or nanometer materials.

DETAILED DESCRIPTION OF EMBODIMENTS

The present invention is further described in detail below with reference to examples and figures; however, the embodiments of the present invention are not limited thereto.

Example 1

Figure 1:
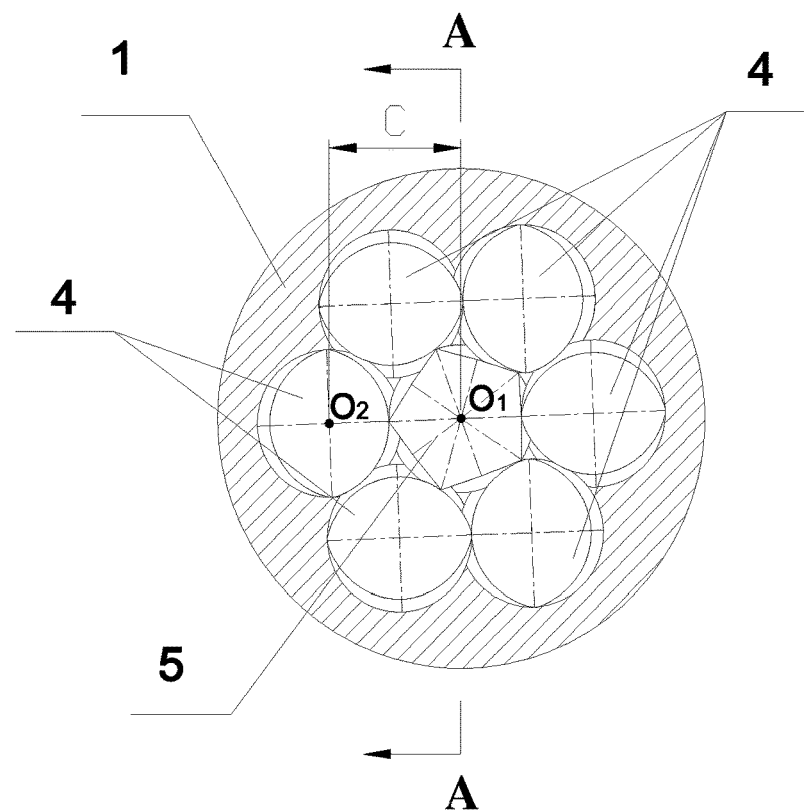
FIG. 1 is a structural schematic view of the cross section of the screw mechanism and the barrel in example 1.
Figure 4:
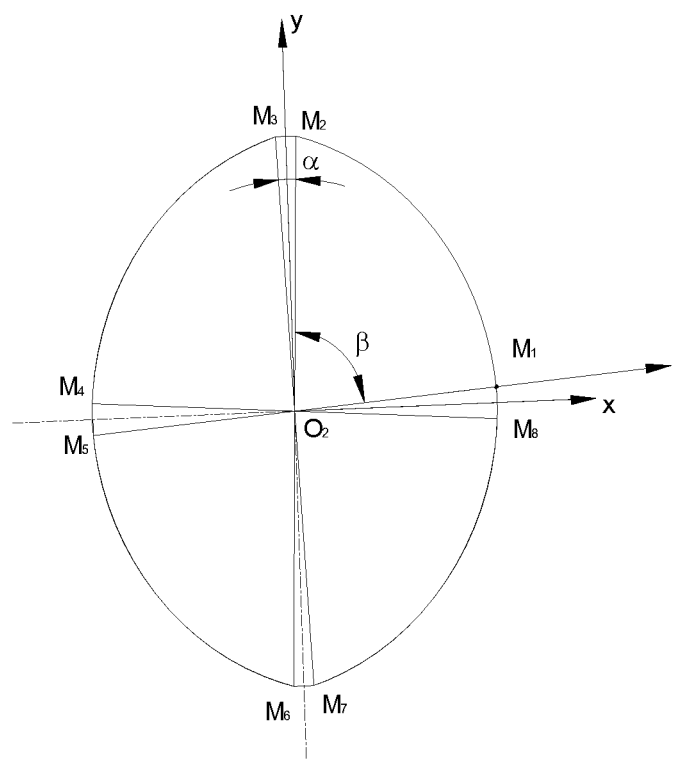
FIG. 4 is a structural schematic view of the cross section of peripheral screws in example 1.
Figure 5:
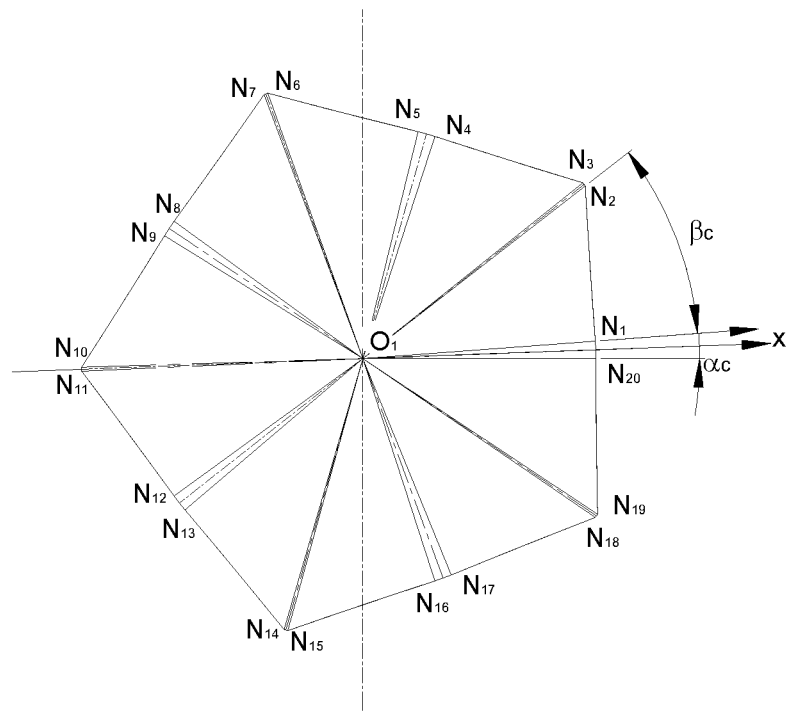
FIG. 5 is a structural schematic view of the cross section of a center screw in example 1.

As shown in FIGS. 1-5, a co-rotating self-cleaning multi-screw extruder with a speed ratio of 2.5 of the present invention comprises a barrel 1 and a screw mechanism; the barrel is provided with an inner cavity, the screw mechanism is installed in the inner cavity of the barrel, and the screw mechanism comprises a center screw 5 and peripheral screws 4. The peripheral screws mesh with the center screw, the outermost edges of the peripheral screws are all tangent to the inner wall of inner cavity; each two adjacent peripheral screws sometimes mesh with and sometimes separate from each other, and this combination takes full advantages of the periodic and intermittent effects on mixing and melting; channels are formed between the peripheral screws, the center screw and the inner cavity of the barrel. The cross section contour of each peripheral screw is formed of 4 sections of circular arcs and 4 sections of non-circular curved arcs as shown in FIG. 4. The cross section contour of the center screw is formed of 10 sections of circular arcs and 10 sections of non-circular curved arcs as shown in FIG. 5. The peripheral screws are each of a double threaded structure, and the center screw is of a quintuple threaded structure; when the peripheral screws rotate in the same direction as the center screw, the periphery screws rotate in the same direction and at the same speed, and the rotation speed of each peripheral screw is 2.5 times that of the center screw; and the peripheral screws are always meshed with the center screw during the rotation of the screw mechanism to achieve the self-cleaning effects. As shown in FIG. 1, the inner cavity of the barrel comprises six cylindrical grooves in communication with each other.

Figure 2:
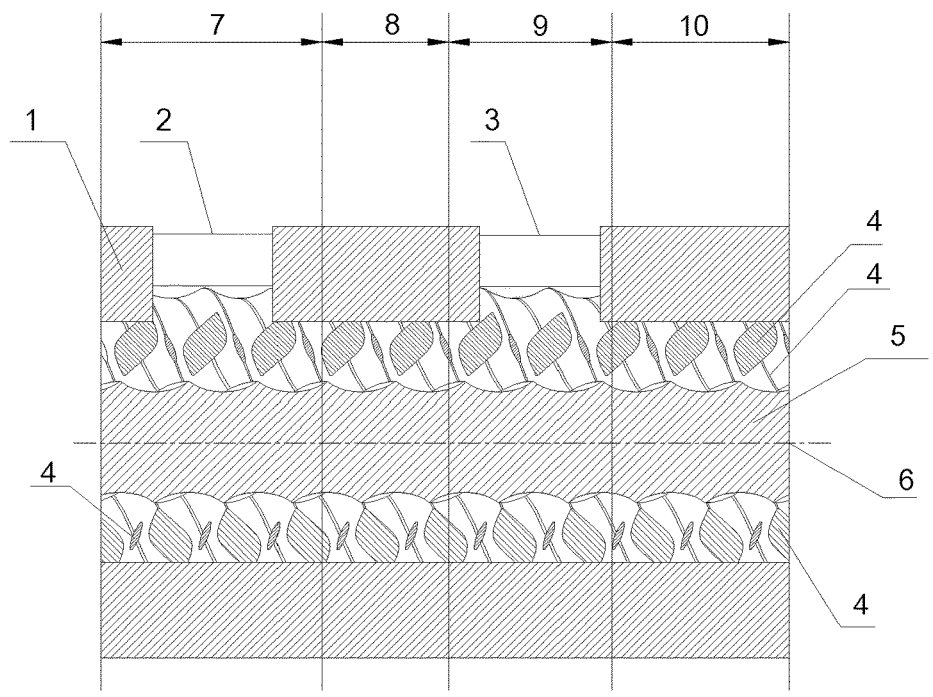
FIG. 2 is a cross section view along A-A direction in FIG. 1 of example 1.
Figure 3:
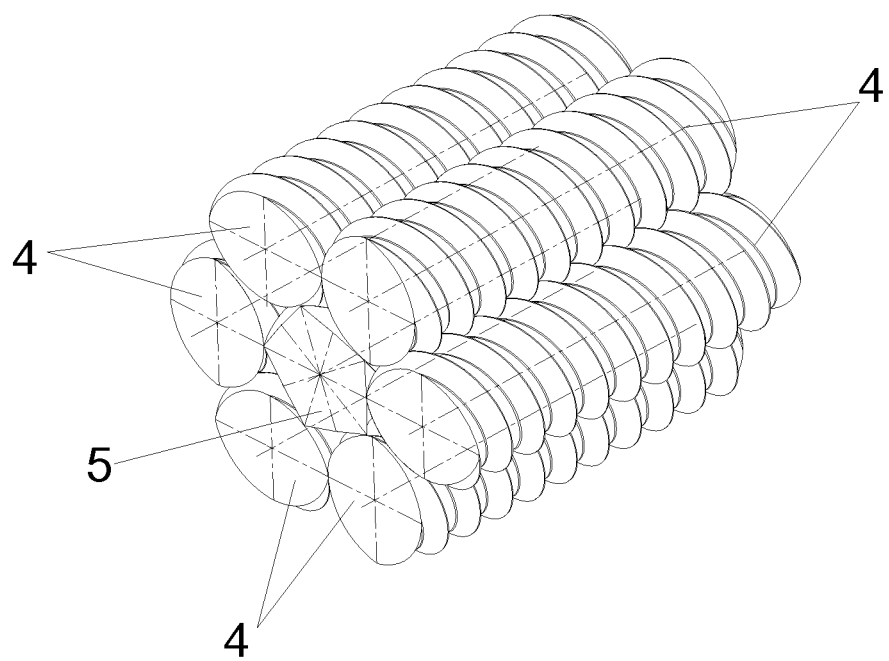
FIG. 3 is a three-dimensional structural schematic view of the screw mechanism in example 1.

As shown in FIG. 2, the barrel is provided with a conveying section 7, a melting section 8, an exhaust section 9 and a mixing and extruding section 10 which are arranged in sequence along a material conveying direction; the conveying section is provided with a feed port 2 in communication with the inner cavity of the barrel, the exhaust section is provided with an exhaust port 3 in communication with the inner cavity of the barrel; and an end of the mixing and extruding section is provided with a discharge port 6.

As shown in FIG. 1, supposing the distance between the rotation center O2 of the peripheral screw 4 and the rotation center O1 of the central screw 5 is C, the largest outer diameter of the peripheral screws and center screw is D, and the smallest inner diameter is d, the inner diameter d of the screws is:

$$d=2C-D.$$

The cross section contour of each peripheral screw in the screw mechanism comprises 8 sections of curves, M1M2, M2M3, M3M4, M4M5, M5M6, M6M7, M7M8 and M8M1, as shown in FIG. 4; more particularly, the central angle of curve M1M2 is:

$$\beta = \frac{7}{2}\arccos\left(\frac{C}{D}\right)$$

Defining O2M1 as the polar axis with a given auxiliary angle and when meets the following conditions, $$0 \le \theta \le \arccos\left(\frac{C}{D}\right)$$

the polar angle is obtained which satisfies the definition of the equation:

$$\gamma = \frac{5\theta}{2} + \mathrm{atan}\left(\frac{D\sin\theta}{2C - D\cos\theta}\right)$$

and then the polar radius of curve M1M2 satisfies the following equation:

$$\rho(\gamma) = \sqrt{\left(\frac{D}{2}\right)^2 + C^2 - D \cdot C\cos\theta}$$

wherein, curves M2M3 and M6M7 are circular curves, the radii are D/2, and the given corresponding central angles are both $\alpha$. Curves M4M5 and M8M1 are also circular curves, the radii are d/2, and the corresponding central angles are both $\pi$-$2\beta$-$\alpha$.

Making O2$y$ pass through the center point of the circular arc M2M3, as a result, the circular arcs of M3M4 and M1M2 are symmetrical about O2$y$.

Making O2$x$ pass through the center point of the circular arc M6M7, as a result, the circular arcs of M7M8 and M1M2 are symmetrical about O2$x$. Likewise, curves M5M6 and M3M4 are symmetrical about O2$x$.

As shown in FIG. 5, the cross section contour of the center screw comprises 20 sections of curves: N1N2, N2N3, N3N4, N4N5, N5N6, N6N7, N7N8, N8N9, N9N10, N10N11, N11N12, N12N13, N13N14, N14N15, N15N16, N16N17, N17N18, N18N19, N19N20 and N20N1. The central angle of curve N1N2 is:

$$\beta_c = \frac{7}{5}\arccos\left(\frac{C}{D}\right)$$

Defining O1N1 as the polar axis, when the given auxiliary angle $\theta$ satisfies:

$$0 \le \theta \le \arccos\left(\frac{C}{D}\right)$$

the polar angle can be defined as:

$$\gamma = \frac{2\theta}{5} + \mathrm{atan}\left(\frac{D\sin\theta}{2C - D\cos\theta}\right)$$

and curve N1N2 satisfies the following equation:

$$\rho(\gamma) = \sqrt{\left(\frac{D}{2}\right)^2 + C^2 - D \cdot C\cos\theta}$$

Curves N2N3, N6N7, N10N11, N14N15, and N18N19 are circular curves, the radii are D/2, and their corresponding central angles are $$\frac{2(\pi - 2\beta - \alpha)}{5}.$$

In contrast, the curved arcs of N4N5, N8N9, N12N13, N16N17 and N20N1 are also circular curves, the radii are d/2, and the corresponding central angles are $\alpha_c =$ $$\alpha_c = \frac{2\alpha}{5}.$$

Furthermore, the curved arc N5N6 is obtained by the curved arc N1N2 counterclockwise rotating by an angle of 72° around the rotation center point O1. The curved arc N9N10 is obtained by the curved arc N1N2 counterclockwise rotating by an angle of 144° around O1. The curved arc N13N14 is obtained by the curved arc N1N2 clockwise rotating by an angle of 144° around O1. The curved arc N17N18 is obtained by the curved arc N1N2 clockwise rotating by an angle of 72° around O1.

Making O1$x$ pass through the center point of the circular arc of N20N1, the curved arc N19N20 and N1N2 are symmetrical about O1$x$. Likewise, the curved arc N3N4 is obtained by the curved arc N19N20 counterclockwise rotating by an angle of 72° around the rotation center point O1. The curved arc N7N8 is obtained by the curved arc N19N20 counterclockwise rotating around O1. The curved arc N11N12 is obtained by the curved arc N19N20 clockwise rotating by an angle of 144° around O1. The curved arc N15N16 is obtained by the curved arc N19N20 clockwise rotating by an angle of 72° around O1.

Meanwhile, D/d=1.1-1.5 and the screw pitch is equal to 0.01D-100000D.

The extruding method implemented by means of the above-described co-rotating self-cleaning multi-screw extruder with a speed ratio of 2.5 comprises the following steps:

(1) after the material enters a channel of the conveying section from the feed port, the center screw and the peripheral screws rotate in the same direction around respective axes; the material is conveyed to the melt section under the action of both an axial positive displacement conveying force and a frictional force between the center screw and the peripheral screws; at the same time, the mixing of material constituents from different thread grooves is achieved through a periodically open space between the adjacent peripheral screws;

(2) when the material moves to a channel in the melting section, the channel formed by meshing of the center screw and the peripheral screws are cut into two, and heat transfer is enhanced due to the resulted interface regeneration, while the material is compressed and squeezed due to the speed difference between the center screw and the peripheral screws and space compression, thereby achieving the pre-melting of the material, and the material is further melted due to combined action of friction heat generated by the high speed rotation of the screws and external heating of the barrel, such that the material is turned into melt;

(3) after the melted material enters a channel of the exhaust section, the periodically open space is formed between thread grooves of adjacent peripheral screws, and the space is directly in communication with thread groove channels of the center screw, thus achieving the direct discharge of gases from the central screw, the channels of the screw sets are in communication with each other such that there are no independent and separate channels, and exhausting surface area of the material is significantly increased, furthermore, the difference in rotation speeds and the variation of material ridges in different thread grooves between the center screw and the peripheral screws accelerate the discharge of gas from the exhaust port, meanwhile, the melted material is further moved in the direction of the mixing and extruding section due to the conveying action of the screw mechanism; and (4) when the melted material enters a channel of the mixing and extruding section, the melted material is subjected to the topological chaos action, by which same is cut into two portions, caused by the channel formed between the screws, and to the intermittent action caused by the periodically open space between the adjacent peripheral screws, such that the chaos mixing caused by the random motion is achieved; furthermore, due to the periodic compression-expansion action generated in the channel formed by the adjacent peripheral screws, and the action of different rotation speeds of the center screw and the peripheral screws, the melted material is mixed and plasticized, thus the melted material is stably extruded from the discharge port; meanwhile, the peripheral screws and the center screw wipe each other so that the self-cleaning effect is achieved.

Example 2

Figure 6:
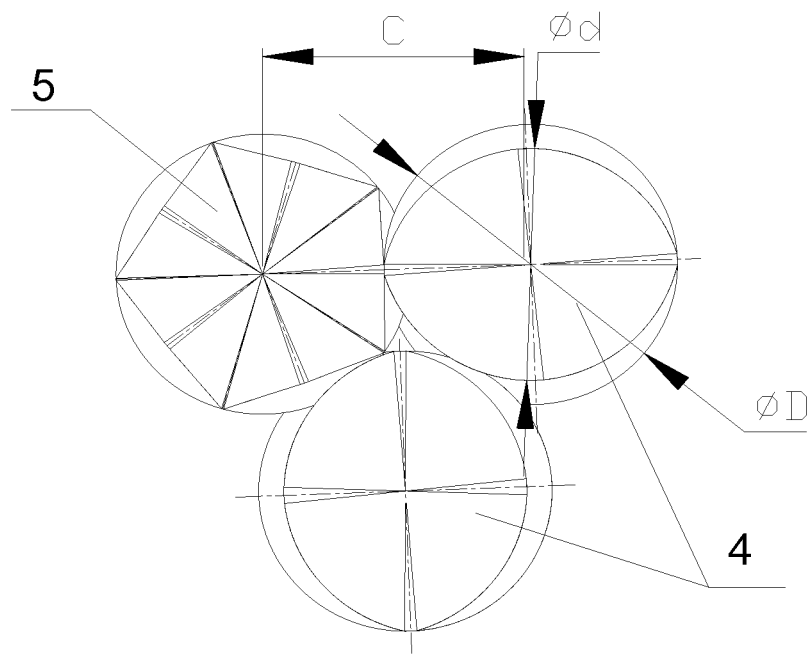
FIG. 6 is a structural schematic view of the cross section of a screw mechanism in example 2.
Figure 7:
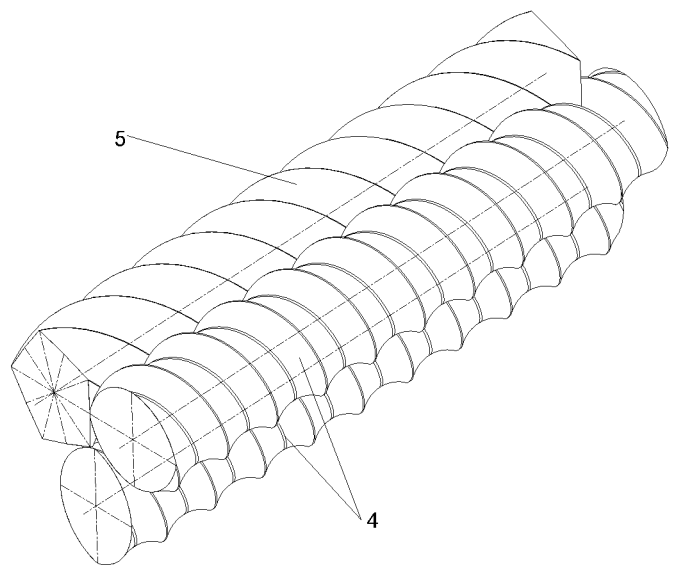
FIG. 7 is a three-dimensional structural schematic vie of the screw mechanism in example 2.

The differences of the co-rotating self-cleaning multi-screw extruder with a speed ratio of 2.5 in this example compared with that of example 1 are: as shown in FIG. 6 or 7, the screw mechanism comprises two peripheral screws and a center screw, the two peripheral screws are distributed on the same outer side of the center screw, and connecting lines between centers of the center screw and two peripheral screws form an equilateral triangle in the cross-sectional profile of the screw mechanism.

Example 3

Figure 8:
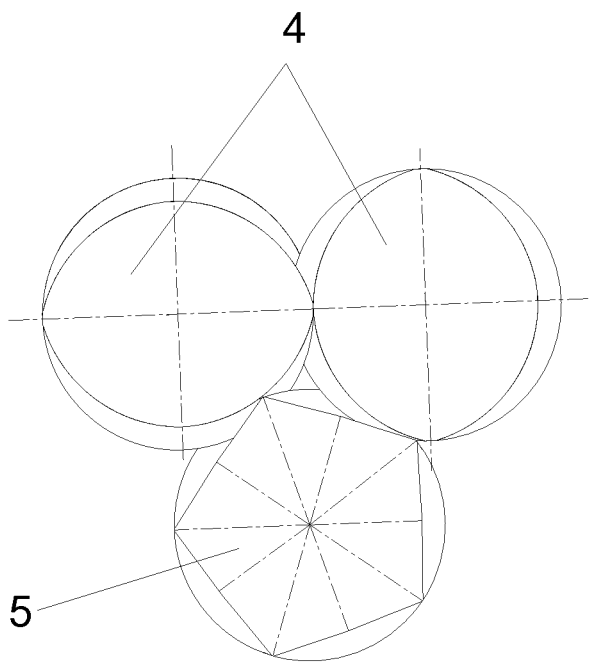
FIG. 8 is a structural schematic view of the cross section of a screw mechanism in example 3.
Figure 9:
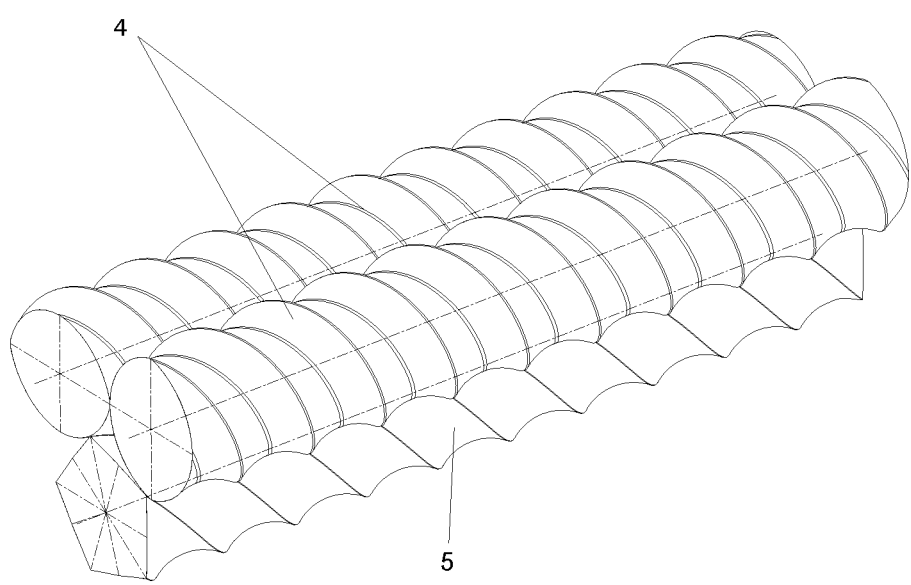
FIG. 9 is a three-dimensional structural schematic vie of the screw mechanism in example 3.

The differences of the co-rotating self-cleaning multi-screw extruder with a speed ratio of 2.5 in this example compared with that of example 1 are: as shown in FIG. 8 or 9, the screw mechanism comprises two peripheral screws and a center screw, the two peripheral screws are distributed below the center screw, and connecting lines between centers of the center screw and two peripheral screws form an equilateral triangle in the cross-sectional profile of the screw mechanism.

The present invention can be favourably implemented as stated above. The above examples are preferred embodiments of the present invention; however, the embodiments of the present invention are not limited by the above examples, and any other alteration, modification, substitution, combination and simplification made without departing from the spiritual essence and principle of the present invention are equivalent replacements and fall within the scope of protection of the present invention.

What is claimed is:

1. A co-rotating self-cleaning multi-screw extruder with a speed ratio of 2.5 comprising a barrel and a screw mechanism installed in an inner cavity of the barrel, wherein the screw mechanism comprises a center screw and at least two peripheral screws; the peripheral screws are both of a double threaded structure, and the center screw is of a quintuple threaded structure; the peripheral screws rotate in the same direction as the center screw, the rotation speed of each peripheral screw is 2.5 times that of the center screw; and the peripheral screws are always meshed with the center screw during the rotation of the screw mechanism, whereas the adjacent peripheral screws are intermittently meshed.

2. The co-rotating self-cleaning multi-screw extruder with a speed ratio of 2.5 according to claim 1, wherein the screw mechanism comprises a center screw and six peripheral screws, and the six peripheral screws are evenly distributed along the outer circumferential direction of the center screw; outer contour lines of the six peripheral screws are tangent to an inner wall of the barrel, and a material transport channel is formed between the screw mechanism and the inner cavity of the barrel.

3. The co-rotating self-cleaning multi-screw extruder with a speed ratio of 2.5 according to claim 1, wherein cross section contours of the center screw and the peripheral screws are respectively formed of multiple connected sections of curved arcs, there are 20 sections of curve arcs that form the cross section contour of the center screw, and there are 8 sections of curve arcs that form the cross section contour of the peripheral screw.

4. The co-rotating self-cleaning multi-screw extruder with a speed ratio of 2.5 according to claim 3, wherein the maximum outer diameter of the center screw and each peripheral screw is D, the minimum inner diameter thereof is d, D/d=1.1-1.5, and the screw lead is 0.01D-100000D.

5. The co-rotating self-cleaning multi-screw extruder with a speed ratio of 2.5 according to claim 3, wherein a cross section contour of the central screw is pentagonal in its entirety, all the peripheral screws have the same structure, and the cross section contour of the peripheral screw is ellipse in its entirety.

6. The co-rotating self-cleaning multi-screw extruder with a speed ratio of 2.5 according to claim 3, wherein the curved arcs successively connected to form the cross section contour of the center screw are N1N2, N2N3, N3N4, N4N5, N5N6, N6N7, N7N8, N8N9, N9N10, N10N11, N11N12, N12N13, N13N14, N14N15, N15N16, N16N17, N17N18, N18N19, N19N20 and N20N1, among them, N2N3, N6N7, N10N11, N14N15, N18N19, N4N5, N8N9, N12N13, N16N17 and N20N1 are all circular curves;

the curved arcs of the center screw successively connected to form the cross section contour of the peripheral screw are M1M2, M2M3, M3M4, M4M5, M5M6, M6M7, M7M8 and M8M1; among them, M2M3, M6M7, M4M5 and M8M1 are all circular curves.

7. The co-rotating self-cleaning multi-screw extruder with a speed ratio of 2.5 according to claim 1, wherein the screw mechanism comprises a center screw and two peripheral screws, the two peripheral screws are distributed on the same outer side of the center screw, and connecting lines between centers of the center screw and two peripheral screws form a equilateral triangle in the cross-sectional profile of the screw mechanism.

8. The co-rotating self-cleaning multi-screw extruder with a speed ratio of 2.5 according to claim 1, wherein the barrel is provided with a conveying section, a melting section, an exhaust section and a mixing extrusion section, and the conveying section, the melting section, the exhaust section and the mixing extruding section are arranged in sequence along a material conveying direction; the conveying section is provided with a feed port in communication with the inner cavity of the barrel, the exhaust section is provided with an exhaust port in communication with the inner cavity of the barrel, and an end of the mixing extruding section is provided with a discharge port.

9. An extruding method for the co-rotating self-cleaning multi-screw extruder with a speed ratio of 2.5 according to claim 1, wherein after the material enters the inner cavity of the barrel, the material continuously conveys forward under the drive of the screw mechanism; during the conveying process, there is a periodically open space between each adjacent peripheral screws, providing the periodical and intermittent mixing action in the screw mechanism, so that material from different thread grooves is mixed with each other; meanwhile, due to the topological chaos cutting into two action formed between the center screw and the peripheral screws, and the chaos mixing caused by the random motion which is generated from the periodical changes of the passageway, the entire material conveying passageway is formed between the screw mechanism and the inner cavity of barrel, thus achieving the periodical action of "compression-expansion-recompression-reexpansion"; furthermore, due to the tensile force field action brought by the differences of the rotation speed between the center screw and the peripheral screw, the compression preheating and dispersion mixing of the material are achieved.

10. The extruding method for the co-rotating self-cleaning multi-screw extruder with a speed ratio of 2.5 according to claim 9, wherein the specific process for conveying the material in the barrel is as follows:

(1) after the material enters a passageway of the conveying section from the feed port, the center screw and the peripheral screws rotate in the same direction around respective axes; the material is conveyed to the melt section under the action of both an axial positive displacement conveying force and a frictional force between the center screw and the peripheral screws; at the same time, the mixing of material constituents from different thread grooves is achieved through a periodically open space between the adjacent peripheral screws;

(2) when the material moves to a passageway in the melting section, the passageway formed by meshing of the center screw and the peripheral screws are cut into two, and heat transfer is enhanced due to the resulted interface regeneration, while the material is compressed and squeezed due to the speed difference between the center screw and the peripheral screws and space compression, thereby achieving the pre-melting of the material, and the material is further melted due to combined action of friction heat generated by the high speed rotation of the center screw and the peripheral screws and external heating of the barrel, such that the material is turned into melt;

(3) after the melted material enters a passageway of the exhaust section, the periodically-open space is formed between thread grooves of adjacent peripheral screws, and the space is directly in communication with thread groove passageway of the center screw, thus achieving the direct discharge of gases from the central screw, the passageways of the screw mechanism are in communication with each other such that there are no independent and separate passageways, and exhausting surface area of the material is increased, furthermore, the difference of rotation speeds and the variation of material ridges in different thread grooves between the center screw and the peripheral screws accelerate the discharge of gas from the exhaust port, meanwhile, the melted material is further moved in the direction of the mixing extrusion section due to the conveying action of the screw mechanism; and (4) when the melted material enters a passageway of the mixing extrusion section, the melted material is under the topological chaos cutting into two action caused by the passageway formed between the center screw and the peripheral screws, and under the intermittent action caused by the periodically open space between the adjacent peripheral screws, thus the chaos mixing caused by the random motion is achieved; furthermore, due to the periodic "compression-expansion" action generated from the passageway formed by the adjacent peripheral screws, and the action of different rotation speed of the center screw and the peripheral screws, the melted material is mixed and plasticized, thus the melted material is stably extruded from the discharge port; meanwhile, the peripheral screws and the center screw wipe each other so that the self-cleaning effect is achieved.

* * * * *

UNITED STATES PATENT AND TRADEMARK OFFICE
CERTIFICATE OF CORRECTION

PATENT NO. : 11,110,637 B2
APPLICATION NO. : 16/609059
DATED : September 7, 2021
INVENTOR(S) : Baiping Xu et al.

It is certified that error appears in the above-identified patent and that said Letters Patent is hereby corrected as shown below:

On the Title Page

Column 1, Item (73), Assignee, Line 1, after "Polytechnic" insert -- , (CN) --

Signed and Sealed this
Eleventh Day of January, 2022

Drew Hirshfeld
*Performing the Functions and Duties of the
Under Secretary of Commerce for Intellectual Property and
Director of the United States Patent and Trademark Office*